(No Model.)

J. GUEDEL.
SAW.

No. 424,194. Patented Mar. 25, 1890.

Witnesses
E. Wurdeman
J. F. Riley

Inventor
John Guedel,
By his Attorneys,
C. A. Snow & Co.

UNITED STATES PATENT OFFICE.

JOHN GUEDEL, OF CAMBRIDGE CITY, INDIANA.

SAW.

SPECIFICATION forming part of Letters Patent No. 424,194, dated March 25, 1890.

Application filed June 20, 1889. Serial No. 314,941. (No model.)

*To all whom it may concern:*

Be it known that I, JOHN GUEDEL, a citizen of the United States, residing at Cambridge City, in the county of Wayne and State of Indiana, have invented a new and useful Improvement in Saws, of which the following is a specification.

My invention relates to an improvement in saws; and it consists in the peculiar construction and arrangement of the saw-teeth, as will be more fully set forth hereinafter, and particularly pointed out in the claim.

Figure 1:
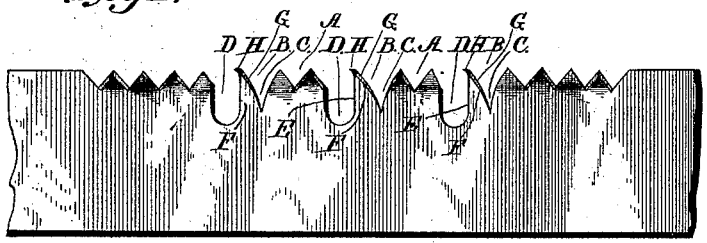
Figure 2:

In the accompanying drawings, Figure 1 is a side elevation of a portion of the saw-blade provided with teeth embodying my improvements. Fig. 2 is an edge view of the same.

The cutting-teeth A are arranged in pairs throughout the length of the saw-blade at suitable regular intervals to within a short distance of the ends, where the teeth are not separated, and said cutting-teeth are triangular in shape and are sharpened on opposite edges alternately and are swaged or set, as shown. Arranged between each pair of cutting-teeth A is a drag or clearing tooth B. The space C in rear of each drag-tooth is narrower than the space D in front thereof, and is triangular in shape, thereby leaving a sufficient space in advance of each drag-tooth for the accumulation of sawdust, and consequently preventing the saw from binding in the kerf. The front edge E of each drag-tooth is perfectly straight and at right angles to the blade, and the rear side F of each drag-tooth is curved and inclined, as shown, and is beveled or sharpened on opposite sides to form an edge G. The point H of each drag-tooth is curved forward to form a hook, as shown. The said hooks when the saw is in operation engage and run in the bottom of the kerf and tend to deepen the same, and thereby assist the cutting-teeth A. At the forward stroke of the saw the clearing-teeth B eject the sawdust which accumulates in the spaces D, and at the rearward stroke of the saw the sharpened rear edges G of the cutting-teeth adapt the latter to pass freely through any sawdust which may remain in the kerf and avoid all tendency to bind.

A saw thus constructed is adapted to clear out the sawdust as rapidly as it accumulates in the kerf, is very easily operated, and has maximum efficiency.

My improved construction and arrangement of the saw-teeth will be found of great utility for buck-saws and also for hand-saws, whether designed for cross-cutting or for ripping.

Having thus described my invention, I claim—

The saw having the pairs of cutting-teeth A, and the clearing-teeth B, arranged between said pairs of cutting-teeth, said clearing-teeth having the straight front edges E, the hooked points H, and the curved rear sides F, beveled on opposite sides to form sharpened edges G, substantially as described.

In testimony that I claim the foregoing as my own I have hereto affixed my signature in presence of two witnesses.

JOHN GUEDEL.

Witnesses:
 HARRY LONG,
 ALEX. H. STONECIPHER.